WILLIAM T. RICKARD.
Improvement in Ore-Washers.
No. 126,744. Patented May 14, 1872.
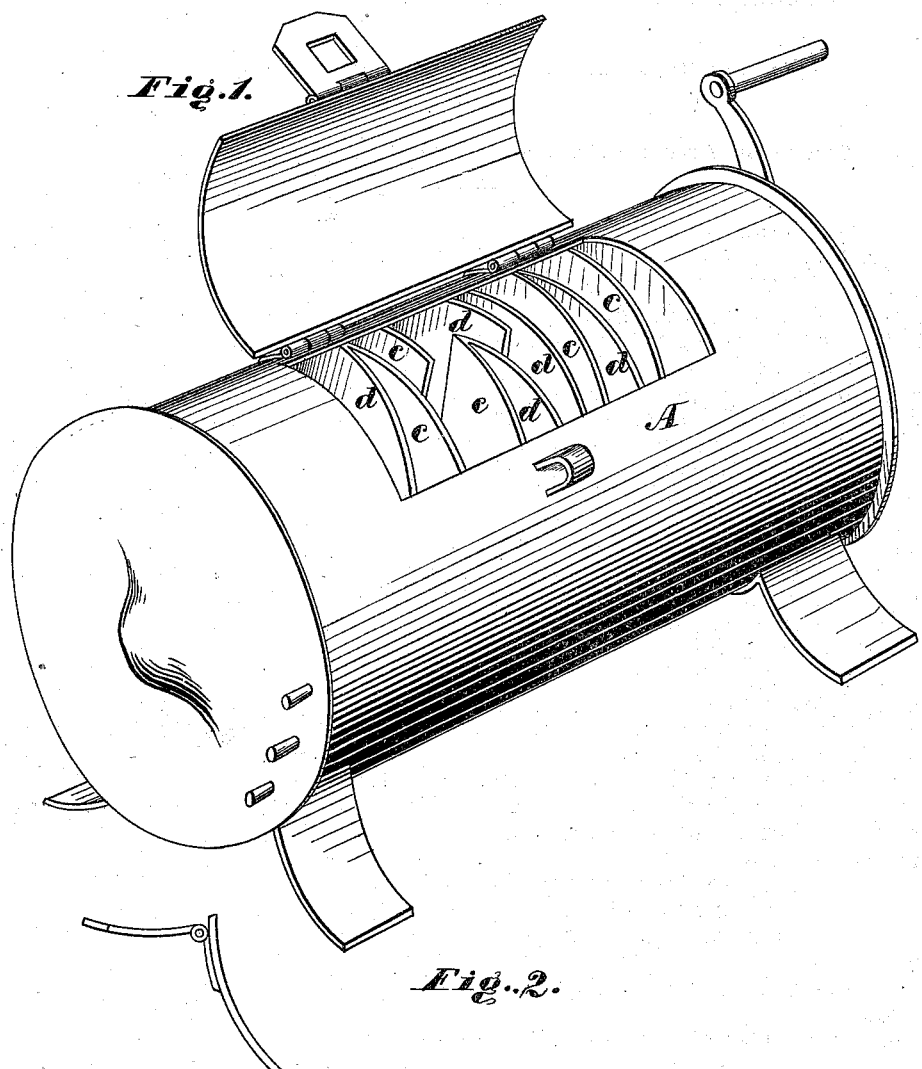

126,744

UNITED STATES PATENT OFFICE.

WILLIAM T. RICKARD, OF MONITOR, CALIFORNIA.

IMPROVEMENT IN ORE-WASHERS.

Specification forming part of Letters Patent No. 126,744, dated May 14, 1872.

SPECIFICATION.

*To all whom it may concern:*

Be it known that I, W. T. RICKARD, of Monitor, county of Alpine, State of California, have invented a Machine for Washing, Concentrating, and Amalgamating Ores; and I do hereby declare the following description and accompanying drawing are sufficient to enable any person skilled in the art or science to which it most nearly appertains to make and use my said invention or improvements without further invention or experiment.

My improvements relate to a machine for washing, concentrating, and amalgamating ores; and it consists of a tank or vessel, inside of which circular plates peculiarly arranged are caused to revolve, and by their movement, when amalgamated, gather up the fine particles of floating metal known as float gold, which is ordinarily carried away and lost when not amalgamated. These plates serve to wash or concentrate tailing. My machine can also be employed as a churn for converting milk or cream into butter, the same operation serving for this purpose.

In order to more fully illustrate and explain my invention, reference is had to the accompanying drawing forming a part of this specification, in which—

Figure 1 is a perspective view. Fig. 2 is a sectional view.

A is a tank or cylinder of any proper construction. A shaft, B, passes across this tank and carries alternate disks $c$ $d$, of copper and galvanized iron. These disks are twisted upon one side of the shaft, in an opposite direction from the twist upon the opposite side, thus converting each disk into two oppositely-inclined screw-sections, and they are arranged upon the shaft in such a position that the curve of each pair of disks will stand in an opposite direction upon the same side of the shaft. This manner of twisting the disks will give them a back-and-forth or sweeping motion in the water, and being arranged as above described the water in the tank will be alternately drawn toward a central line drawn between the disks and thrown outward from the central line, thus giving a dashing back and forth of the water in the tank; or each two disks can be united at one edge, so as to present a V-form with the shaft passing through the center, and thus give the motion which is called a fish-tail motion; or the disks can be crossed in the center, so as to present an X-form or double fish-tail. When these disks are amalgamated with mercury and revolved in the above manner in water containing fine particles of gold or silver the particles will be caught by the amalgamated surface by being thus dashed against them. The combination of copper and galvanized iron disks will produce an electrical action which also greatly aids in settling and retaining the particles of gold or silver. When not amalgamated these revolving disks can be used for washing and concentrating tailings by agitating the water in the tank so as to permit the sulphides or other heavy mineral to subside to the bottom while a stream of water carries off the light earthy matter through a suitably-located plug-hole.

Having thus described my invention, what I claim, and desire to secure by Letters Patent, is—

The tank A with its shaft $b$, in combination with the disks $c$ $d$, arranged to give a fish-tail or back-and-forth motion in the water, substantially as and for the purposes above described.

In witness whereof I hereunto set my hand and seal.

WILLIAM T. RICKARD. [L. S.]

Witnesses:
MICHAEL KENNEDY,
GEO. W. WHITE.